United States Patent
Bridges

(10) Patent No.: US 6,524,005 B2
(45) Date of Patent: Feb. 25, 2003

(54) TOUCHDOWN BEARING ASSEMBLY WITH ACTUATOR RING ASSEMBLY

(75) Inventor: Eric B. Bridges, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 36 days.

(21) Appl. No.: 09/874,715

(22) Filed: Jun. 4, 2001

(65) Prior Publication Data
US 2002/0181818 A1 Dec. 5, 2002

(51) Int. Cl.[7] .............................................. F16C 32/04
(52) U.S. Cl. ...................................... 384/102; 310/90.5
(58) Field of Search .......................... 384/102; 310/90.5

(56) References Cited

U.S. PATENT DOCUMENTS

| | | | |
|---|---|---|---|
| 4,015,882 A | | 4/1977 | Stenert |
| 4,260,204 A | | 4/1981 | Hirt et al. |
| 4,628,522 A | * | 12/1986 | Ebersberger ............... 310/90.5 |
| 4,629,261 A | | 12/1986 | Eiermann et al. |
| 4,641,978 A | | 2/1987 | Kapich |
| 5,231,323 A | * | 7/1993 | New ............................ 310/90 |
| 5,272,403 A | * | 12/1993 | New ............................ 310/90 |
| 5,419,212 A | | 5/1995 | Smith |
| 5,679,992 A | | 10/1997 | Miyamoto et al. |
| 5,747,907 A | | 5/1998 | Miller |
| 5,810,485 A | * | 9/1998 | Dublin et al. ............... 384/102 |
| 5,977,677 A | * | 11/1999 | Henry et al. ................. 310/90 |
| 6,074,165 A | * | 6/2000 | Casaro et al. ............... 384/102 |
| 6,194,801 B1 | * | 2/2001 | Goransson ................... 384/102 |

* cited by examiner

Primary Examiner—Thomas R. Hannon
(74) Attorney, Agent, or Firm—Robert Desmond, Esq.

(57) ABSTRACT

A touchdown bearing and actuator ring assembly for selectively biasing a ball bearing into direct engagement with a rotating shaft subject to significant axial thrust forces. The Actuator ring assembly includes a pair of relatively rotatable ring members abutting the bearing assembly. Confronting faces of the ring members include protuberances. As the ring members undergo relative rotation, the protuberances come into alignment, wedging-apart the ring members and biasing the bearing assembly into contact with the rotating shaft. A disengagement actuator selectively rotates the ring members in the opposite direction until the protuberances are out of alignment, allowing a restraining spring to bias the bearing assembly away from the rotating shaft. The present invention provides an assembly capable of quickly and repeatedly engaging and disengaging the touchdown bearing with the rotating shaft, using a minimum of envelop space and weight.

26 Claims, 6 Drawing Sheets

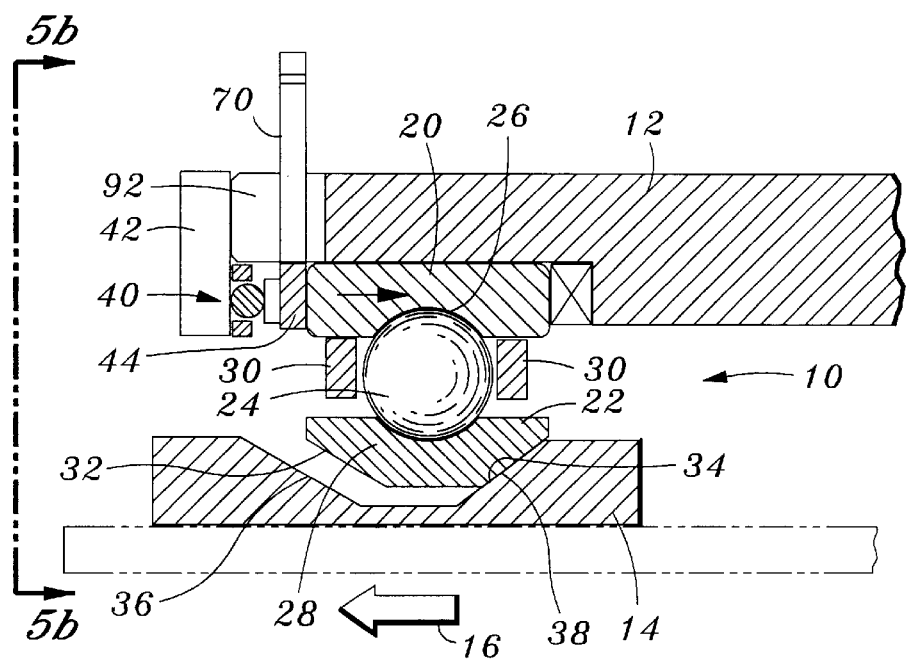
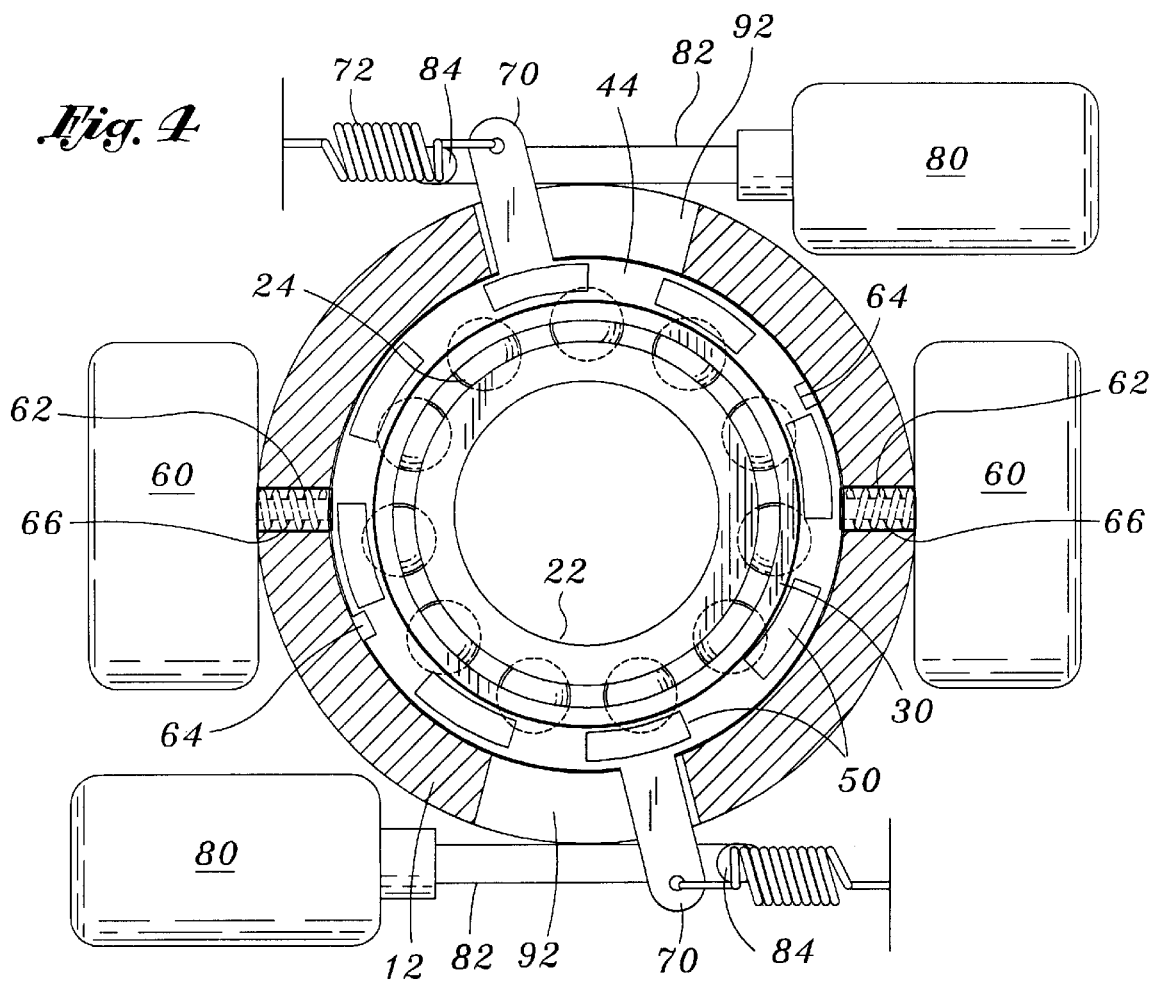

TOUCHDOWN BEARING ASSEMBLY WITH ACTUATOR RING ASSEMBLY

GOVERNMENT RIGHTS

The United States Government has rights in this invention pursuant to Contract No. DAAH10-98-C-0023.

BACKGROUND OF THE INVENTION

The present invention generally relates to a class of bearings identified as touchdown or backup bearings used to selectively support rotor systems having magnetic bearings as the primary support bearings. More particularly, the present invention is directed to a touchdown bearing assembly having a unique actuator assembly capable of quickly and repeatably engaging and disengaging the touchdown bearing with the shaft with a minimum of overall space and weight.

Magnetic bearings are often employed to support gas turbines and other high speed rotating machinery because of their unique ability to suspend and balance the rotor without the need for metal-to-metal contact with a rolling bearing. However, in the event of a fault or instability or even inoperability of the magnetic bearings, it is imperative that back-up rolling bearing(s) immediately engage and support the rotating shaft to avoid damage to the machine due to direct rubbing contact between rotating and static hardware.

The majority of touchdown bearings in use today employ a passive engagement scheme, in which the inner bore diameter of the bearing has a radial clearance to the rotating shaft surface when in the disengaged position. During startup and shutdown, or in the event of a magnetic bearing fault, the rotating shaft drops onto the touchdown bearing. In order to prevent damage to the machine, the radial touchdown-bearing gap must be smaller than the radial clearance between the rotor and the static structure. On gas turbine engines, the operating blade to shroud tip clearance can be 0.006 inches or less, leaving little radial clearance for a passive engagement scheme using radial clearance between the bearing and the rotor shaft.

In an effort to overcome the problems associated with the radial clearance approach, U.S. Pat. No. 5,747,907 issued May 5, 1998 to Miller, suggests that a conical feature be used for centering the rotor to prevent whirl, and allow the rotor to safely spin down. Miller is directed to supporting flywheel energy storage devices that do not produce any significant axial force on the rotating shaft. To engage the bearing, Miller suggests that either a spring or a piston may be employed. It would be prohibitive to employ either of these actuators with a machine subjected to the type of thrust forces affecting gas turbine rotors. If a spring actuator of the type suggested by Miller were employed in a gas turbine machine, the spring would have to be unduly large to overcome the thrust forces that are tending to compress it. In addition, the mechanism for holding the touchdown bearing system in its disengaged position would necessarily have to be large in mass with a correspondingly slow reaction time due to the large electromagnetic force required to keep the touchdown bearing in the disengaged position against the high force of the engagement springs. Such a system would also have a large continuous electrical requirement to supply the electromagnet used to keep the touchdown bearing disengaged. Alternatively, if a piston actuator were employed as suggested in Miller, there would be a slow reaction time due to the limitations in pumping fluid into the piston chamber as well as due to the mass of the hardware.

In a further known assembly suggested in U.S. Pat. No. 4,629,261 issued Dec. 16, 1986 to Elermann et al., a rolling backup bearing assembly is engaged via a spring with an electric release mechanism. A purely axial spring is employed to move the bearing in the axial direction into engagement with the rotor. The system described in Elermann can only tolerate axial thrust loads that are below the spring force. Any higher thrust force would allow axial movement of the backup bearing and potentially allow rubbing between the rotating and static hardware. To assure that the bearing would not move when subjected to large axial forces as would occur with gas turbines, Elermann would have to employ a very large spring as well as a massive electromagnetic release mechanism, again consuming significant electrical power, and slowing down the reaction time due to the high mass.

There is clearly a need for a backup or touchdown bearing assembly that quickly engages the rotating gas turbine shaft without requiring a massive spring actuator or massive electromagnetic release mechanism. If the backup bearing actuator and release mechanism does not have to directly counteract the large axial thrust forces produced by the rotating gas turbine shaft, the mechanism could be made small and lightweight, allowing it to achieve the desired quick response times with reduced power consumption.

SUMMARY OF THE INVENTION

In one aspect of the present invention, a rapid engagement touchdown bearing and actuator ring assembly includes a rotating bearing movable in an axial direction into and out of surface contact with a rotating shaft which may be subject to strong axial forces, i.e., a gas turbine shaft. The actuator ring assembly includes a pair of ring members positioned adjacent the bearing assembly and capable of both relative rotational and axial motion. As one of the rings moves axially, it engages and moves the bearing in an axial direction against the action of a restraining spring assembly until a beveled surface on the bearing engages a similar surface on the rotating shaft. One or more control actuator spring(s) cause relative rotation of the actuator rings in a first direction until protuberances extending from one of the rings align with confronting protuberances extending from the other ring, causing the rings to wedge-apart, biasing the bearing assembly into direct contact with the rotating turbine shaft.

To disengage the touchdown bearing from the rotating shaft, at least one disengagement actuator is energized which causes reverse relative rotation of the rings in a second, opposite direction until the protuberances on the rings are out of alignment with each other, negating the wedging pressure between the rings, and thus allowing the restraining spring(s) to rapidly move the touchdown bearing assembly in the reverse axial direction, out of engagement with the rotating shaft.

Preferably the protuberances mounted on the face of one of the rings include a series of circumferentially-spaced balls or rollers while the protuberances mounted on the confronting face of the other ring include a corresponding series of circumferentially-spaced, incline ramps. Relative rotational movement of the rings in the first predetermined direction causes the balls or rollers to progress up the ramps, wedging-apart the rings. Rotation of one of the rings of about only 100–150 relative to the remaining ring is needed to align the protuberances and reach maximum ring separation of about 0.010 to 0.020 inches of the confronting ring faces. Such movement can take as little as about 2 milliseconds. The protuberances attached to the rings were designed to assure the rings remain in their wedged-apart positions without further assistance from the actuator control spring(s), even when subjected to significant axial thrust forces. As a result, the actuator ring assembly of the present invention requires a much smaller actuator control spring(s) than would otherwise be necessary. The invention described above can be made to function on one individual touchdown bearing, engaging it to support one end of a rotating shaft, providing close radial support and reaction of any axial rotor thrust loads, or the system can be adapted to engage two or more touchdown bearings to provide fast-responding touchdown bearing support at both ends of the rotor.

In another aspect of the invention, a pair of separate touchdown bearing assemblies, each having at least one beveled edge portion, may be wedged-apart in opposite axial directions, making contact with separate, beveled surfaces of the rotating shaft. A ring fixed against rotation and yet axial movable may be associated with one touchdown bearing assembly and a ring capable of both rotating and axial movement may be associated with the other touchdown bearing. One of the rings is preferably restrained against rotation while both rings are capable of axial movement. When the actuator ring assembly undergoes relative rotation, the protuberances on the confronting faces come into alignment and the rings are wedged-apart in opposite axial directions. Each ring engages a separate touchdown bearing, eventually pressing the touchdown bearings in opposite directions into engagement with the rotating shaft at two separate locations In still another aspect of the invention, a first touchdown bearing assembly can be brought into engagement with a rotating shaft by axial movement of the rotating ring as discussed above, with a separate restraining spring being compressed as the rotating shaft moves an axial distance sufficient to bring a second touchdown bearing assembly into contact with the rotating shaft.

In a yet further aspect of the invention, an electric gear motor may be employed in a disengagement actuator, causing relative rotation of the rings in the opposite direction to negate the wedging pressure and allow the restraining spring(s) to bias the touchdown bearing out of contact with the rotating shaft. Alternatively, the gear motor may be replaced by an electric jackscrew, a hydraulic piston and cylinder using oil, fuel or a dedicated hydraulic fluid. In another aspect of the invention, a pneumatic piston and cylinder may be employed in the disengagement actuator.

These and other features, aspects and advantages of the present invention will become better understood with reference to the following drawings, description and claims.

BRIEF DESCRIPTION OF THE DRAWINGS

FIG. 3 is a cross-sectional view of the touchdown bearing assembly of the present invention in the engaged position;

FIG. 4 is a sectional view taken along the section B—B in FIG. 3;

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
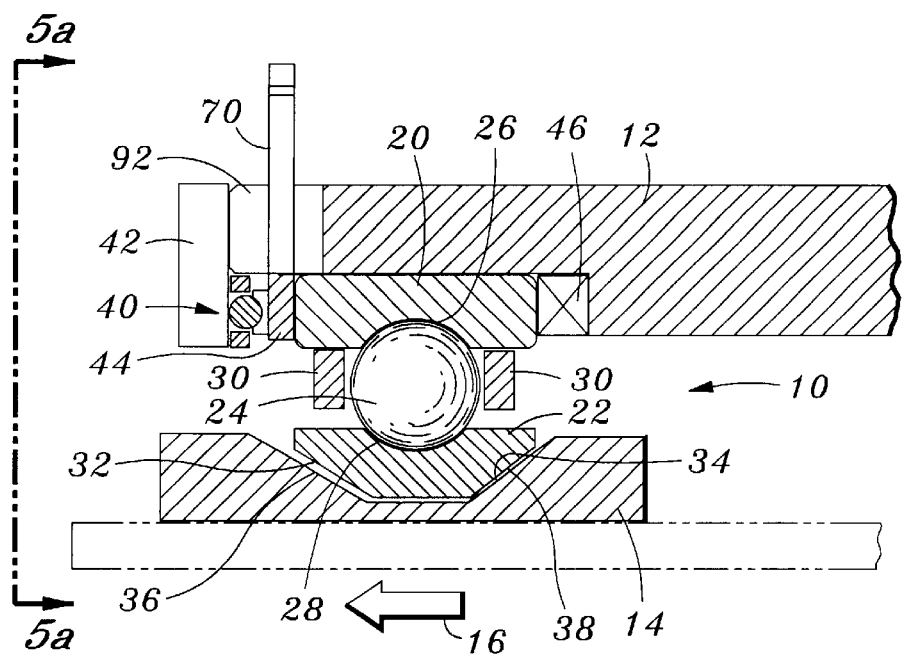
FIG. 1 is a cross-sectional view of a touchdown bearing assembly of the present invention in the disengaged position.

Referring to FIG. 1, a touchdown bearing assembly 10 formed in accordance with the present invention is disposed between a static housing 12 to selectively provide backup bearing support for a rotating shaft 14 of the type employed in a gas turbine assembly or similar machinery. During high-speed operation, rotating shaft 14 may be subjected to large axial thrust forces, with the axial force direction indicated by arrow 16. A magnetic bearing assembly, not shown, normally functions as the total support for rotating shaft 14 within housing 12. However, in the event that such a magnetic bearing in any way becomes unavailable, i.e., structural failure, instability or even electrical power is interrupted, it is imperative that touchdown-bearing assembly 10 be capable of rapidly taking over the total bearing duties in support of rotating shaft 14.

Touchdown bearing assembly 10 includes an outer race 20, a radially aligned inner race 22 and a number of spherical ball bearings 24 mounted for rotation there between. The outer race 20 may take the form of a cylindrical ring having an inner, semi-circular channel 26 in which ball bearings 24 are retained. Like wise, inner race 22 also may take the form of a cylindrical ring having an outer semi-circular channel 28 in which ball bearings 24 are retained. In a preferred embodiment, outer race 20 may be constructed from a plurality of separate, arc-shaped sections, which are separable to allow insertion of ball bearings 24 into bearing assembly 10. It is considered within the scope of the present invention to form inner race 22, rather than outer race 20, out of a plurality of arc-shaped sections, to allow for insertion of ball bearings 24.

The spherical ball bearings 24 may be constructed of silicon nitride or they may be made of any hard substance such as steel. To keep balls 24 evenly separated and to provide a dry film sacrificial lubricant, a cylindrical separator 30 may be disposed between races 20 and 22. Separator 30 is formed with radially spaced, cylindrical holes to contain the ball bearings 24. Separator 30 may be formed of self-lubricating carbon-carbon or a carbon-graphite composite. Finally, inner race 22 may include at least one edge 32 having a substantially conical or bevel shape. Alternatively, opposite edges 32 and 34 of inner race 22 may each be beveled. As will be explained, engagement between one or both of the beveled edges 32 and/or 34 and corresponding beveled surface portions 36 and/or 38 of rotating shaft 14 occurs when touchdown bearing assembly 10 is biased in either axial direction into direct contact with rotating shaft 14.

An actuator ring assembly 40 positioned adjacent to touchdown bearing assembly 10 is shown in its disengaged position in FIG. 1, and in its engaged position in FIG. 3. Actuator ring assembly 40 includes a fixed actuator ring or collar member 42, supported by housing 12 and a rotatable actuator ring or collar member 44 positioned between ring 42 and outer race 20 of bearing assembly 10. Fixed actuator ring 42 is restrained against both rotational and axial movement. In comparison, rotatable actuator ring 44 is capable of limited rotation relative to actuator ring 42 as well as axial movement relative to fixed actuator ring 42. At least one restraining spring 46 is compressed between housing 12 and an opposite side of race 20 from actuator ring assembly 40. The restraining spring(s) 46 serves to axially bias touchdown bearing assembly 10 towards actuator assembly 40 and out of contact with rotating shaft 14. Preferably, one or more wave springs 46 having multiple convolutions are utilized in touchdown bearing assembly 10 in order to apply a substantially uniform biasing pressure against outer race 20 of touchdown bearing 10.

As shown in FIGS. 1, 3, 5a and 5b, fixed actuator ring 42 and rotatable actuator ring 44 have confronting faces formed with protuberances adaptable for selective engagement with one another as rotatable actuator ring 44 rotates between its disengaged and engaged positions. In particular, the confronting face of fixed actuator ring 42 includes a number of separate incline ramps 50, circumferentially-spaced from one another. Ramps 50 are of similar size and shape, with each ramp extending toward the confronting face of rotatable actuator ring 44. Each ramp 50 includes an inclined portion 52 and a flat portion 54. The confronting face of fixed actuator ring 42 further includes a flat surface portion 58 located between an end of each ramp 50 and a beginning of an adjacent ramp 50. The protuberances mounted on the confronting face of rotatable actuator ring 44 may include a number of circumferentially spaced bumps 56. Preferably, the protuberances may include a plurality of spaced spherical ball bearings or cylindrically-shaped rollers 56, circumferentially-spaced from one another and selectively alignable with ramps 50. If spherical ball bearings or cylindrical rollers are employed, they may be made of steel or silicon nitride. The advantage of using ball bearings or rollers as opposed to bumps is in the reduced amount of friction. However, using ball bearings or rollers as the protuberances 56 may slightly increase the complexity of the assembly as opposed to merely forming bumps on rotatable actuator ring 44.

Figure 5A:
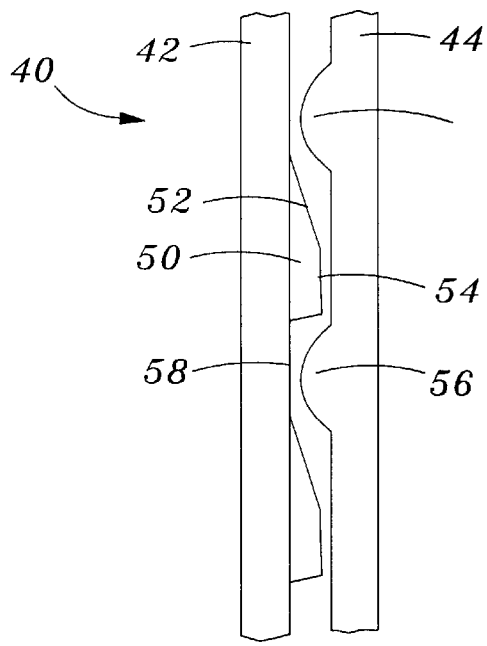
FIGS. 5a and 5b are partial sections of the touchdown bearing activation mechanism of the present invention in the disengaged and engaged positions, respectively.
Figure 5B:
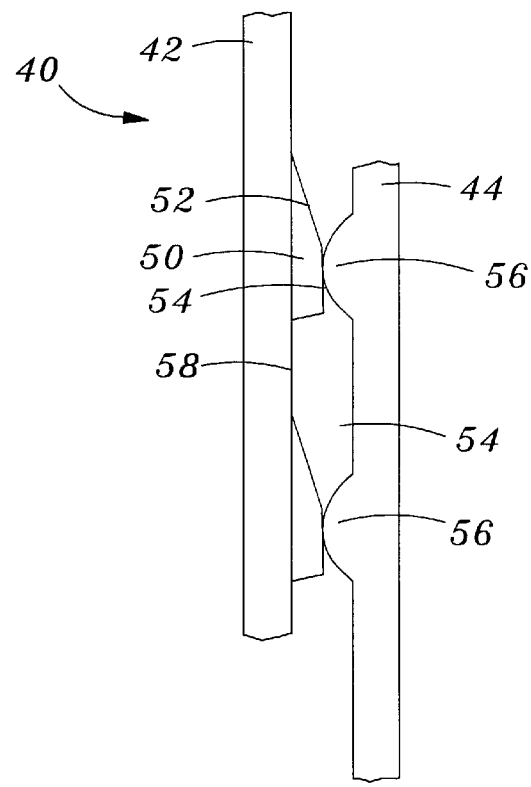

As rotatable actuator ring 44 rotates in the counterclockwise direction from its disengaged position shown in FIGS. 1 and 5a to its engaged position shown in FIGS. 3 and 5b, respectively, the protuberances, i.e., bumps, rollers or spherical ball bearings 56 mounted on rotatable actuator ring 44, first move across the flat surface portion 58 of fixed actuator ring 42. Additional rotational movement of rotatable actuator ring 44 causes each ball or roller 56 to simultaneously proceed up an inclined portion 52 of one of the ramps 50. As the balls or rollers 56 move up their respective ramps 50, actuator rings 42 and 44 begin to wedge-apart. Rotatable actuator ring 44 begins to move in an axial direction away from fixed actuator ring 42 and towards bearing assembly 10. Actuator ring 44 continues to rotate until each of the balls or rollers 56 rests on a flat portion 54 of one of the ramps 50. At this point, actuator ring 44 is wedging-apart a maximum distance relative to actuator ring 42. The maximum axial distance traveled by the confronting face of actuator ring 44 relative to the confronting face of actuator ring 42 may be in the range of 0.010 to about 0.020 inches.

As rotatable actuator ring 44 is wedged-apart from fixed actuator ring 42, it presses outer race 20 of backup bearing assembly 10 against the restraining spring(s) 46. As the restraining spring(s) 46 is forced to compress, outer race 20 engages and presses against ball bearings 24 in the same axial direction which, in turn, axially presses inner race 22 in the same axial direction until the beveled edge portion 34 of inner race 22 makes direct surface contact with the beveled portion 38 of rotating shaft 14. At this point, touchdown-bearing assembly 10 provides direct bearing contact and support for rotating shaft 14.

Figure 2:
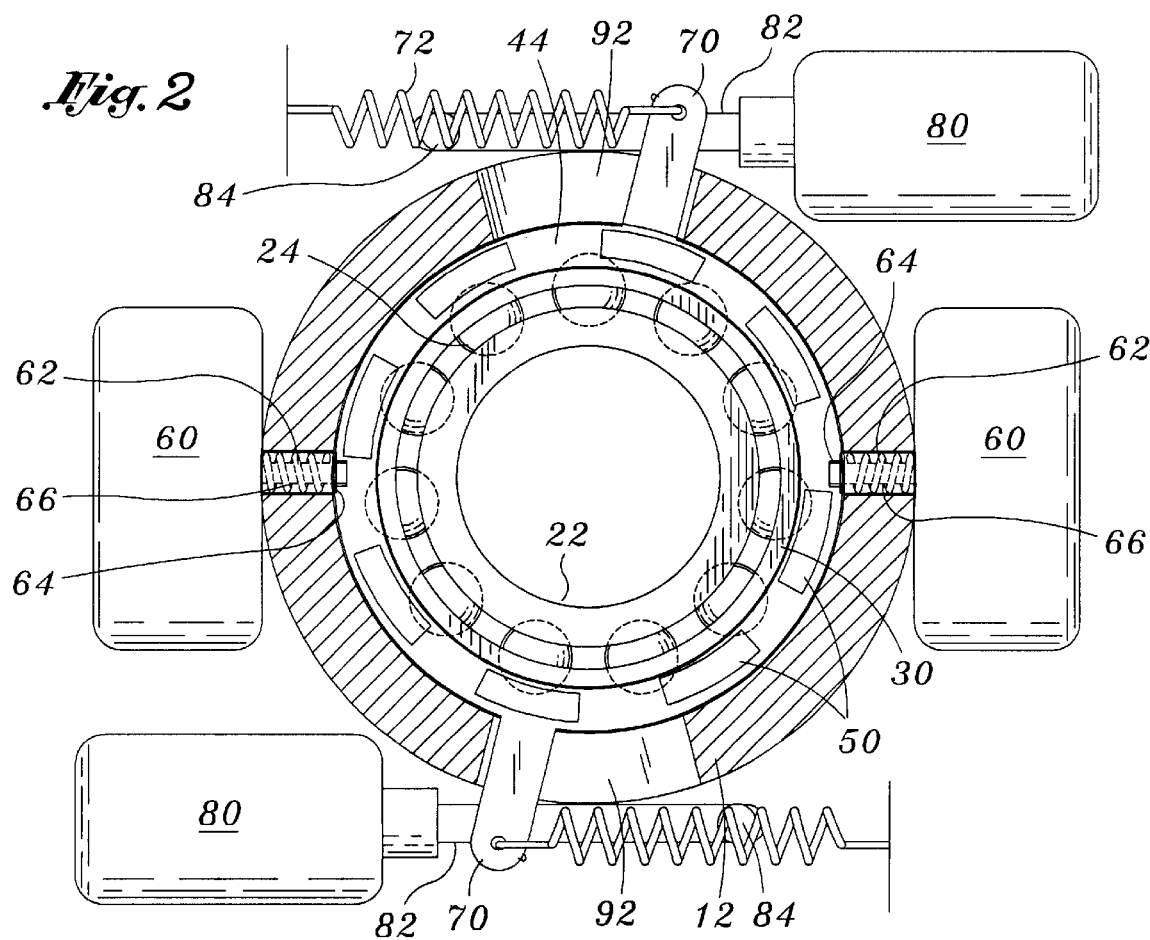
FIG. 2 is a sectional view taken along the section A—A in FIG. 1.

Referring to FIG. 2, the actuator mechanism for engaging touchdown bearing assembly 10 will now be explained. Similar, yet separate solenoids 60 are arranged on opposite sides of touchdown bearing assembly 10. Each solenoid 60 includes a detent 62 extending through an opening in housing 12 into a slot 64 formed in the outer surface of rotatable actuator ring 44. Each detent 62 is partially encircled by a retraction spring 66 also mounted in housing 12 and capable of retracting detent 62 from engagement with slot 64 when solenoid 60 is temporarily de-energized.

A pair of engaging arms 70 extends outwardly from opposite sides of rotatable actuator ring 44. It is considered within the scope of the invention to have a single engaging arm 70 mounted to actuator ring 44. A separate control actuator spring assembly 72 is associated with an end of each of the engaging arms 70. In particular, one end of each control actuator spring 72 is attached to an engaging arm 70 with an opposite end of control actuator spring 72 attached to housing 12. When each detent 62 is aligned with and engages its respective slot 64, each control actuator spring 72 is stretched to a maximum length and touchdown-bearing assembly 10 is in its disengaged position out of contact with rotating shaft 14. To engage touchdown assembly 10, the solenoids 60 are temporarily de-energized, wherein springs 66 automatically retract detents 62 from their respective slots 64. Each of the control actuator springs 72 is free to rapidly compress, rotating ring 44 in the counterclockwise direction relative to ring 42. Because the control actuator springs 72 are small in size and of light weight, they are capable of extremely rapid movement, rotating actuator ring 44 through an angle in the range of about 10°–15° within as short a time as about 2 milliseconds.

Rather than employing circumferential coil springs as the control actuator, hydraulic, pneumatic or electric power may be employed to rotate ring 44 relative to ring 42.

As shown in FIG. 2, separate disengagement actuators 80 in the form of gear motors are also disposed on opposite sides of housing 12 at locations circumferentially-spaced from solenoids 60. Each disengagement actuator 80 includes a reciprocating arm 82 capable of selective, reciprocal movement along its linear axis. Each of the reciprocating arms 82, in turn, includes a flange 84 extending a direction substantially perpendicular to the linear axis of its reciprocating arm 82. When it is desired to disengage touchdown bearing assembly 10 from rotating shaft 14, disengagement actuators 80 are energized. This causes each reciprocating arm 82 to retract toward its housing until its attached flange 84 engages and moves one of the engaging arms 70 in the reverse or clockwise direction. Movement of the engaging arms 70 cause actuator ring 44 to rotate in a clockwise direction, which, in turn, causes the rollers or balls 56 to proceed down each of their respective ramps 50. As actuator ring 44 continues to rotate in the clockwise direction, the rollers or balls or bumps 56 once again reach the flat bottom portions 58 of confronting face of actuator ring 42. The wedging force separating actuator rings 44 and 42 is correspondingly reduced, allowing the restraining spring(s) 46 to expand and promptly separate bearing assembly 10 from rotating shaft 14. At this time, touchdown bearing assembly 10 once again assumes its disengaged position relative to rotating shaft 14.

Disengaged touchdown bearing assembly 10 can be repeatedly re-engaged by temporarily de-energizing solenoids 60 and retracting each detent 62 from its slot 64. Control actuator springs 72 can be relatively small in size and weak in strength because they do not directly counteract the strong axial thrust forces often acting against rotating gas turbine shafts. Control actuator springs 72, providing force on the order of 50 to 100 lb each are sufficient, compared to springs of over 1000 lb if rotor thrust must be reacted by the spring(s). In order to protect actuator ring assembly 40 from damage by over rotation of actuator ring 44, the engagement arms 70 pass through circumferentially-spaced slots 92 formed radially through the thickness of housing 12. Once actuator ring 44 rotates in a counter-clock wise direction a predetermined angular distance of about 10°–15° from its disengaged to its engaged position, each engaging arm 70 reaches the end of its slot 92, preventing further rotation of actuator ring 44. The precise angle through which actuator ring 44 is designed to rotate is a design choice dependent on the size of the components including actuator ring assembly 40 and bearing assembly 10 as well as the desired engagement time of touchdown bearing assembly 10 with rotating shaft 14.

Because the actuator springs 72 only need to rotate actuator ring 44 in as little as 2 milliseconds, the total engagement time of touchdown bearing assembly 10 is significantly less then the engagement time of conventional bearing assemblies. More importantly, the spring driven touchdown bearing assembly 10 does not have to directly oppose the axial thrust forces as required with conventional backup bearings.

In a further aspect of the present invention, the rollers or balls 56 may be mounted on the fixed actuator ring 42 and the incline ramps 50 and interposed flat portions 58 mounted on movable actuator ring 44. In a further aspect of the invention, fixed actuator ring 42 may be mounted between bearing assembly 10 and movable actuator ring 44. In such an embodiment, bearing assembly 10 may include a flange on housing 12 abutting rotatable actuator ring 44, whereby movement of actuator ring 44 creates the axial force that causes a similar axial movement of bearing assembly 10.

In the invention as described, each disengagement actuator 80 may take the form of an electric jackscrew or a hydraulic piston and cylinder using oil pressure, fuel pressure or a dedicated hydraulic fluid. In another aspect of the invention, each disengagement actuator 80 may consist of a pneumatic piston and cylinder using air pressure.

Figure 6A:
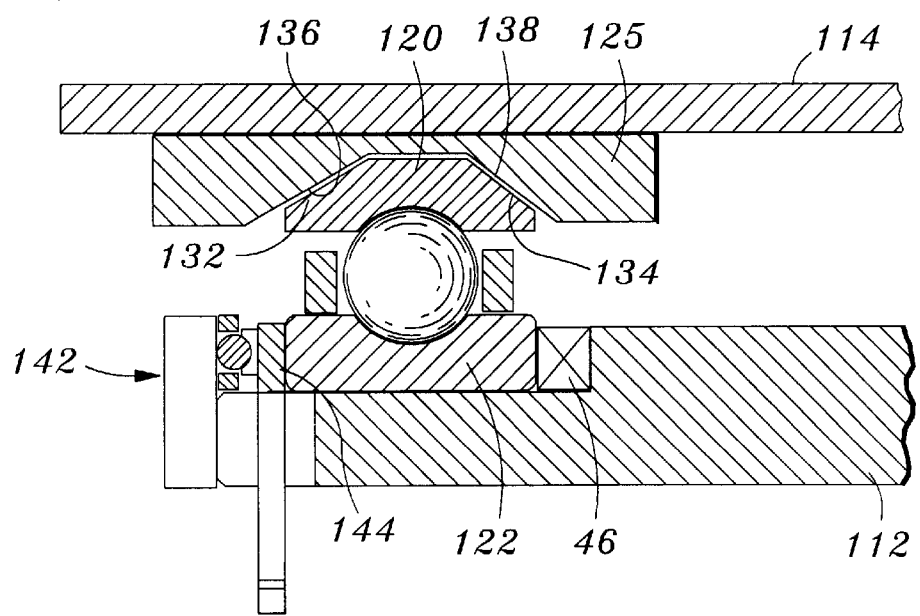
FIGS. 6a, 6b, 6c and 6d are cross-sectional views of alternative embodiments of the touchdown bearing assembly of the present invention.

In another aspect of the present invention as shown in FIG. 6a, the inner race 122 is fixed to a stationary member 112, while the outer race 120 rotates in a bed 125 attached to a rotating member 114. Beveled edges 132 or 134 of outer race 120 are selectively pressed against beveled edges 136 or 138 of the bed 125. A restraining spring 46 biases race 120 out of contact with bed 125. When rotating ring 144 is caused to move relative to a fixed ring 142, protuberances mounted on confronting faces of the rings 142 and 144 are brought into alignment, causing the rings to wedge-apart and press inner race 122 ball bearings 124 and outer race 120 into direct engagement with bed 125.

Figure 6B:
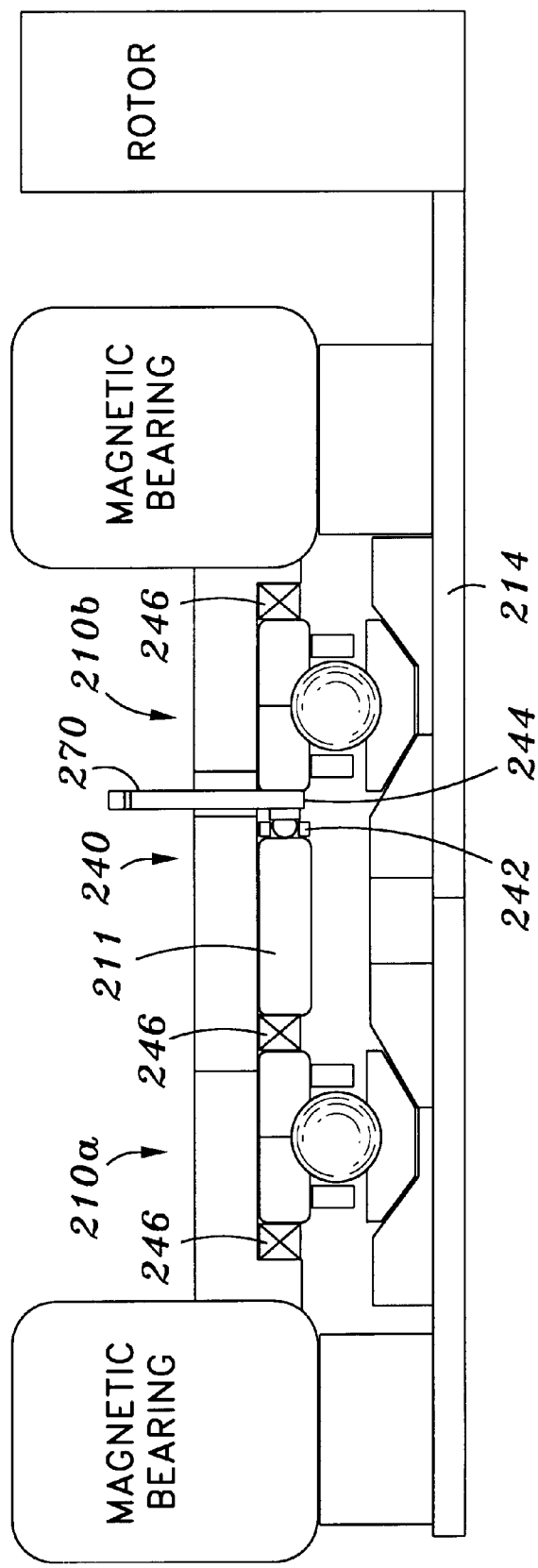

In another aspect of the invention as shown in FIG. 6b, the single touchdown bearing assembly previously described may replaced by two touchdown bearing assemblies 210a and 210b which may be actuated by a single control actuator 240 to each engage a rotating shaft 214 even when not subjected to axial thrust forces. The bearing assemblies 210a and 210b are separated by an outer ring 211 capable of axial movement. During operation, the engaging arm 270 attached to ring 244 moves, causing ring 244 to rotate relative to ring 242. As the rings wedge-apart, restraining springs 246 mounted on the side of bearing assembly 210a opposite from rings 244 and 242 as well as on each side of the separate bearing assembly 210b are compressed. Continued wedging action serves to move the bearing assemblies 210a and 210b to move in opposite directions until each bearing engages shaft 214 at a different location.

Figure 6C:
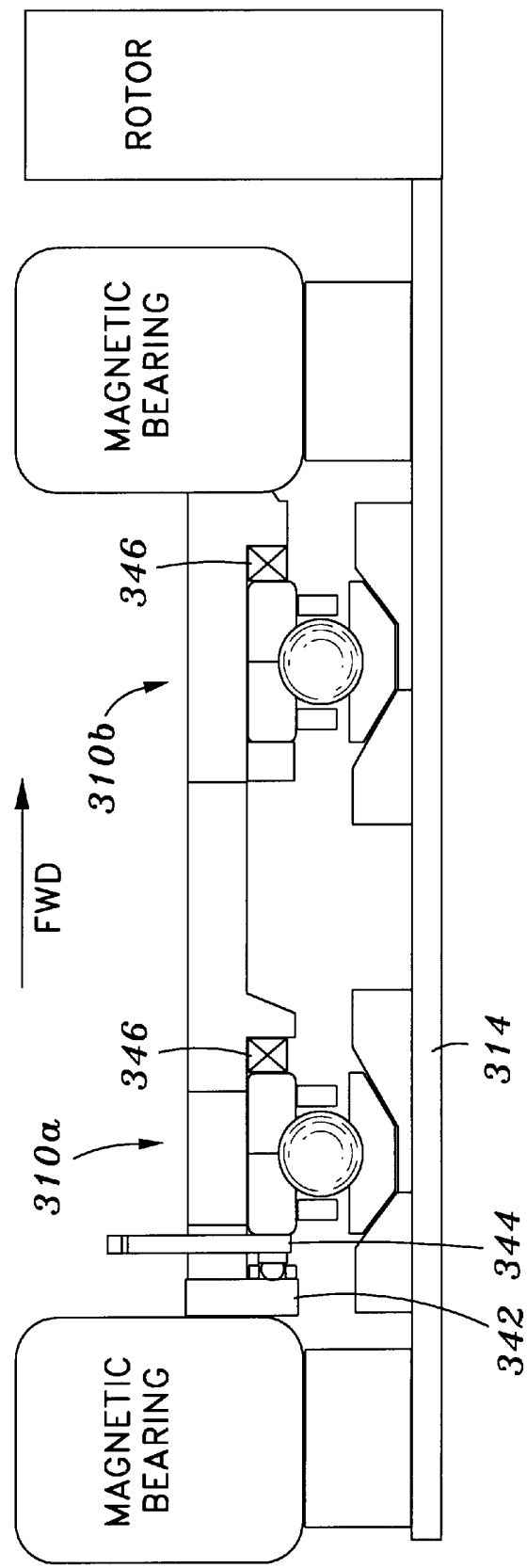

In another aspect of the present invention as shown in FIG. 6c, two touchdown bearing systems 310a and 310b may be caused to move in the same axial direction by means of a single actuator ring assembly 340. As the actuator rings 342 and 344 undergo relative rotation, protuberances on confronting ring faces align, causing the rings to wedge-apart. As the rings move axially, they first press bearing assembly 310a into engagement with shaft 314. Continued pressure on bearing assembly 310a causes it to move shaft 314 axially into direct engagement with the second bearing assembly 310b. Restraining springs 346 are compressed to allow axial movement of the bearing assemblies 310a and 310b, respectively.

Figure 6D:
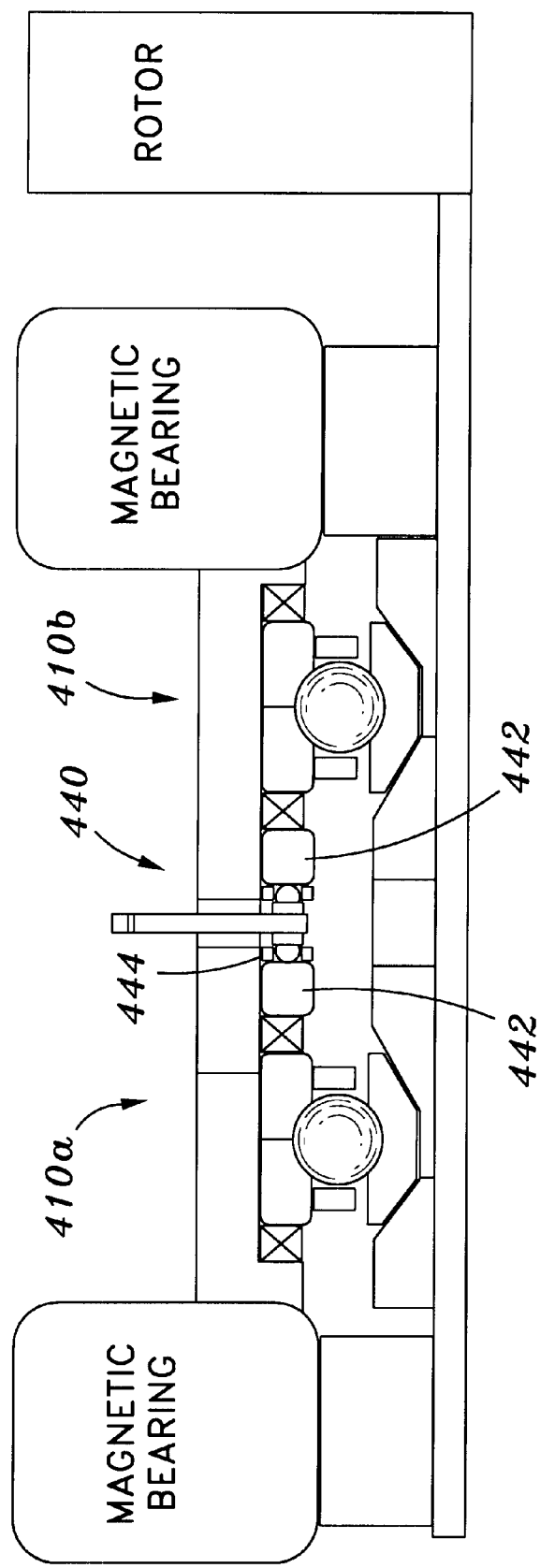

In a yet further aspect of the invention as shown in FIG. 6d, a single control actuator 440 may simultaneously actuate two bearing assemblies 410a and 410b. The rotating ring 444 may have protuberances mounted on opposite sides, with each set of protuberances aligning with additional protuberances mounted on a pair of rotationally fixed rings 442 positioned on either side of ring 444. As ring 444 rotates, the two rings 442 are wedged-apart in the opposite direction from ring 444. This, in turn, causes the two bearing assemblies 410a and 410b to move in opposite axial directions until engaging rotating shaft 410 at different locations.

It should be understood, of course, that the foregoing relates to preferred embodiments of the invention and that modifications may be made without departing from the spirit and scope of the invention as set forth in the following claims.

I claim:

1. A touchdown bearing and actuator assembly mounted in a housing for selectively engaging and supporting a rotating shaft, comprising:

a ball bearing assembly encircling and initially spaced from the rotating shaft when in the disengaged position;

an actuator ring assembly abutting the bearing assembly and capable of selectively moving the bearing assembly from its disengaged to its engaged position directly engaging the rotating shaft, and said actuator ring assembly including a pair of side-by-side actuator ring members disposed adjacent to one side of the bearing assembly, with said actuator rings having protuberances formed on confronting faces capable of circumferential alignment as one of the actuator ring members moves relative to the other actuator ring member;

whereby circumferential alignment of the protuberances wedges-apart the actuator ring members pressing the bearing assembly into direct engagement with the rotating shaft.

2. The touchdown bearing assembly of claim 1, wherein a least one restraining spring is compressed between the housing and a side of the bearing assembly opposite from the actuator ring members to initially bias the bearing assembly out of engagement with the rotating shaft.

3. The touchdown bearing assembly of claim 1, wherein the bearing assembly includes an inner bearing race having a beveled edge confronting a similarly-shaped beveled portion of the rotating shaft, whereby relative rotation of the actuator ring assembly moves the beveled edge of the bearing assembly into direct engagement with the beveled portion of the rotating shaft.

4. The touchdown bearing assembly of claim 1, wherein the side-by-side actuator ring members include a movable actuator ring member positioned adjacent the bearing assembly and capable of limited rotational and axial movement, and a fixed actuator ring member positioned on an opposite side of the movable actuator ring member from the bearing assembly, with the fixed actuator ring member restrained against rotational and axial movement.

5. The touchdown bearing assembly of claim 4, wherein the protuberances formed on confronting face of the fixed actuator ring member include a plurality of circumferentially-spaced ramps having inclined portions and flat portions.

6. The touchdown bearing assembly of claim 5, wherein the protuberances formed on the confronting face of the movable actuator ring include a plurality of circumferentially-spaced elements capable of proceeding up the incline ramps of the fixed actuator ring member as the movable actuator ring member rotates in a counter clock wise direction relative to the fixed actuator ring member.

7. The touchdown bearing assembly of claim 6, wherein the circumferentially-spaced elements mounted on the movable actuator ring member comprise a plurality of separate rolling ball members.

8. The touchdown bearing assembly of claim 6, wherein the circumferentially-spaced elements mounted on the movable actuator ring member comprise a plurality of plurality of cylindrical bumps.

9. The touchdown bearing assembly of claim 4, wherein the protuberances mounted on the confronting face of the movable actuator ring member include a plurality of circumferentially-spaced ramps having inclined portions and flat portions, and the protuberances mounted on the confronting face of the fixed actuator ring member comprise a plurality of circumferentially-spaced rolling ball members capable of proceeding up the ramp incline portions as the movable actuator ring member is rotated relative to the fixed actuator ring member.

10. The touchdown bearing assembly of claim 4, wherein the movable actuator ring member includes at least one outwardly extending stop pin projecting into at least one confronting slot extending into and partially about the housing circumference, to limit angular rotation of the movable actuator ring member relative to the fixed actuator ring member.

11. The touchdown bearing assembly of claim 10, wherein said at least one slot extends an angular distance in the range of 10°–15° about the housing circumference.

12. A touchdown bearing assembly for selectively engaging and supporting a rotating shaft subject to axial thrust forces, comprising:
  a ball bearing assembly encircling and initially radially spaced from the rotating shaft when the bearing assembly is in its disengaged position;
  an actuator ring assembly abutting the bearing assembly and capable of selectively moving the bearing assembly into direct engagement with the rotating shaft;
  a restraining spring assembly compressed between the bearing assembly and the housing for biasing the bearing assembly out of engagement with the rotating shaft; and
  an actuator control assembly for selectively moving the actuator ring assembly between its disengaged and engaged positions, thereby compressing the restraining spring assembly until the bearing assembly directly engages the rotating shaft.

13. The touchdown bearing assembly of claim 12, wherein the actuator ring assembly comprises a pair of actuator ring members positioned side-by-side with confronting ring faces having selectively aligning protuberances, wherein the ring members include a movable ring member capable of both rotational and axial movement and a fixed ring member restrained against rotational and axial movement.

14. The touchdown bearing assembly of claim 13, wherein at least one engaging arm is attached to and extends outwardly from the movable ring member.

15. The touchdown bearing assembly of claim 14, wherein the actuator control assembly comprises at least one actuator spring stretched between the engaging arm and the housing for rotating the movable ring member relative to the fixed ring member.

16. The touchdown bearing assembly of claim 15, wherein at least one detent extends from the housing into an opening in the movable ring member and a solenoid is attached to each detent for selectively withdrawing each detent from its opening, thereby allowing the actuator spring to compress and rotate the movable ring member from its disengaged position to its engaged position, thereby wedging-apart the movable and fixed ring members to press the bearing assembly into direct engagement with the rotating shaft.

17. The touchdown bearing assembly of claim 15, wherein compression of the actuator spring rotates the movable ring member an angular distance in the range of about 10°–15°.

18. The touchdown bearing assembly of claim 15, wherein compression of the actuator spring rotates the movable ring member between its disengaged and engaged positions in about two milliseconds.

19. The touchdown bearing assembly of claim 14, wherein at least one disengagement actuator assembly selectively engages and moves said engaging arm, thereby rotating the movable ring member relative to the fixed ring member from its engaged to its disengaged position.

20. The touchdown bearing assembly of claim 19, wherein the at least one disengagement actuator includes a reciprocating arm having an outwardly extending flange for contacting the engaging arm as the reciprocating arm is withdrawn.

21. The touchdown bearing assembly of claim 19, wherein the disengagement actuator includes a gear motor drive assembly.

22. The touchdown bearing assembly of claim 19, wherein the disengagement actuator includes a hydraulic cylinder drive assembly.

23. A touchdown bearing assembly for selectively engaging a rotating shaft subject to axial thrust forces, comprising:
  a ball bearing assembly encircling initially radially spaced from the rotating shaft when the bearing assembly is in its disengaged position;
  an actuator ring assembly abutting the bearing assembly and upon activation capable of biasing the bearing race assembly into direct engagement with the rotating shaft;
  an actuator control assembly for biasing the actuator ring assembly into the bearing assembly and thus biasing the bearing assembly against the rotating shaft; and
  at least one disengagement actuator assembly for selectively deactivating the actuator ring assembly, thereby allowing the bearing assembly to separate from the rotating shaft.

24. A touchdown bearing assembly according to claim 23, wherein said at least one disengagement actuator includes a reciprocating arm selectively engaging an engaging arm attached to the actuator ring assembly for moving the ring assembly so as to remove the bias against the bearing assembly.

25. The touchdown bearing assembly of claim 23, wherein a restraining spring assembly is compressed between the bearing assembly and the housing for initially biasing the bearing assembly out of engagement with the rotating shaft.

26. A touchdown bearing assembly for selectively engaging a rotating shaft subject to axial thrust forces, comprising:

a ball bearing assembly encircling and initially radially spaced from the rotating shaft when in the disengaged position;

an actuator ring assembly including a pair of actuator ring members positioned side-by-side adjacent the bearing assembly, with protuberances formed on confronting faces of the ring members and only one of the ring members capable of rotational and axial movement compared to the other ring member;

at least one restraining spring biasing said bearing assembly toward said actuator ring assembly;

an actuator control spring moving one of the ring members relative to the other ring member to align the protuberances and wedge-apart the ring members, thereby biasing the bearing assembly into engagement with the rotating shaft; and at least one disengagement actuator including a reciprocating arm for moving one of the ring members relative to the other ring member to misalign the protuberances, allowing the restraining spring to bias the bearing assembly out of engagement with the rotating shaft.

* * * * *